United States Patent [19]

Schiffer et al.

[11] 4,005,246
[45] Jan. 25, 1977

[54] RESERVE-TYPE CELL

[75] Inventors: Stephen F. Schiffer, Waterford; Renato DiPasquale, New Milford, both of Conn.

[73] Assignee: Yardney Electric Corporation, Pawcatuck, Conn.

[22] Filed: Feb. 20, 1973

[21] Appl. No.: 333,992

[52] U.S. Cl. .................................. 429/94; 429/118
[51] Int. Cl.² ........................................ H01M 6/30
[58] Field of Search ............ 136/114, 112, 113, 90, 136/13

[56] References Cited
UNITED STATES PATENTS

| | | | |
|---|---|---|---|
| 1,400,513 | 12/1921 | Benner | 136/114 |
| 2,050,172 | 8/1936 | Gordon | 136/114 X |
| 2,594,879 | 4/1952 | Davis | 136/114 |
| 3,266,942 | 8/1966 | Lear | 136/114 X |
| 3,304,202 | 2/1967 | Sam | 136/114 X |
| 3,376,166 | 4/1968 | Kruden | 136/114 X |
| 3,629,092 | 12/1971 | George | 136/114 X |
| 3,643,834 | 2/1972 | Sabatino | 136/114 X |
| 3,649,363 | 3/1972 | Morehouse et al. | 136/114 |
| 3,712,834 | 1/1973 | Doe et al. | 136/114 |

*Primary Examiner*—C. F. Lefevour
*Attorney, Agent, or Firm*—Whittaker Corporation

[57] ABSTRACT

An improved reserve-type cell is provided which comprises, in combination, a pair of spaced electrodes, a separator between said electrodes, electrolyte storage means comprising bibulous material such as cotton wadding in a cavity disposed in contact with and behind one of the electrodes (which is porous) and out of contact with the other of the electrodes, and electrolyte disposed in the wadding. The electrolyte can be drawn from the storage space through the porous electrode and into contact with the other of the electrodes to activate the cell. Preferably, the electrolyte is in dry form dissolvable in water to activate the cell when needed. Evaporating of the water shuts down the cell until further introduction of water.

9 Claims, 1 Drawing Figure

U.S. Patent  Jan. 25, 1977  4,005,246
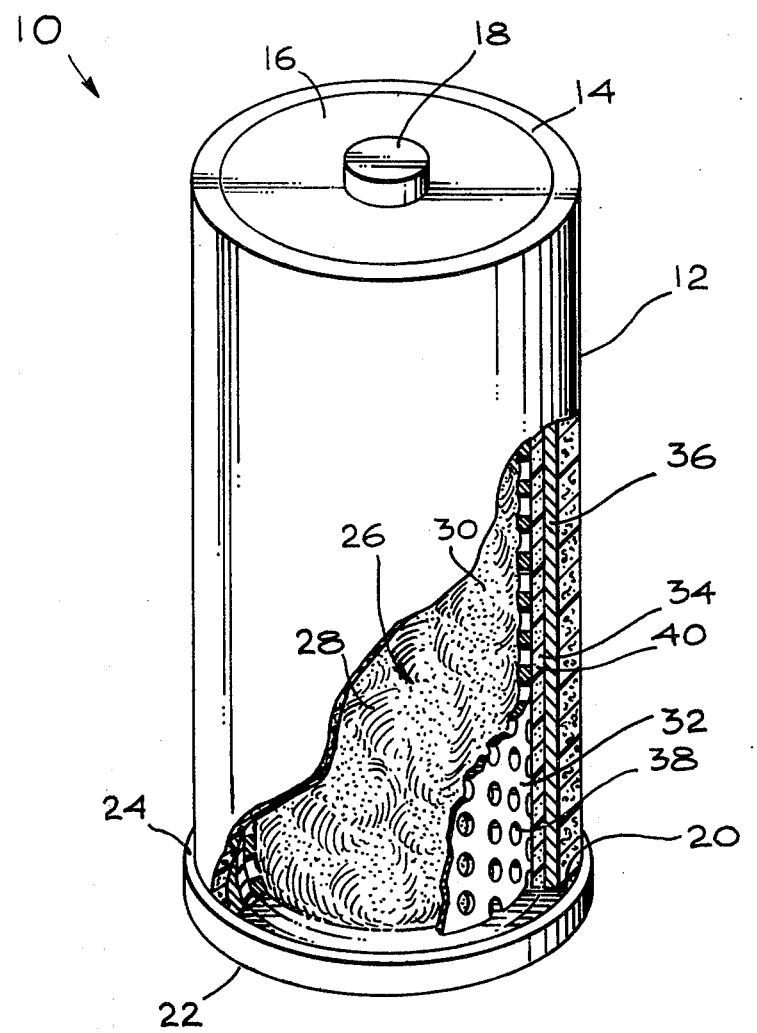

RESERVE-TYPE CELL

BACKGROUND

1. Field of the Invention

The present invention generally relates to electric cells and more particularly to reserve-type cells.

2. Prior Art

Various arrangements of cell components have been made in the past to provide electric power cells with means to periodically activate and deactivate the cells so as to conserve the cells and extend their life. In one such type of cell, either the cell separator between the electrodes or one or both electrodes or all three components are made in a manner to incorporate electrolyte in dry form, capable of being dissolved in water periodically added to the cell so as to periodically activate the cell. When the water of the electrolyte evaporates, the cell stops functioning.

Such a reserve-type cell system is shown, described and claimed in U.S. Pat. No. 3,471,330 issued Oct. 7, 1969 to Carl Berger and Frank Arrance. Such cell, however, requires the use of special forming techniques and special materials in order to properly incoporate the dry electrolyte into the separator and/or electrodes and still permit them to function effectively. Generally, the selection of electrode and separator materials is limited by such requirement. Moreover, the forming techniques may be expensive, rendering such cells inapplicable as low cost power sources.

Accordingly, it would be desirable to provide an inexpensive, simple reserve-type cell incorporating dry electrolyte or other means in a simplified manner to permit periodic activation and inactivation of the cell. Preferably, such cell should be capable of utilizing standard electrodes requiring no special forming techniques.

SUMMARY OF THE INVENTION

The present invention satisfies the foregoing needs and is substantially as set forth in the Abstract above. In this regard, the described improved reserve-type cell incorporates dry electrolyte in an electrolyte storage space with the electrolyte disposed in or an bibulous material. The storage space is located behind one of the electrodes and out of contact with the other of the electrodes. However, the electrode nearest the storage space is porous so that light electrolyte obtained by dissolving the dry electrolyte in the storage space with water can be passed through the porous electrode into contact with the other electrode in order to activate the cell. An amount of dry electrolyte, well in excess of that which is consumable during the life of the cell electrodes, can easily be incorporated into the storage space or added periodically thereto. One or both of the electrodes may also be consumable and various types of electrode pairs can be utilized efficiently.

In one embodiment of the invention, the electrodes, a spacer or separator therebetween and the storage space are all concentrically aligned within a supporting cylinder having an opening in communication with the storage space. The storage space is central of the cell with the porous electrode separator and other electrode in concentric shells therearound. Such an arrangement provides a compact, inexpensive, durable cell of long life capable of being periodically activated and inactivated. Further features of the invention will be apparent from the study of the following detailed description and the accompanying drawings of which:

DRAWINGS

The single FIGURE is a schematic perspective view of a preferred embodiment of the improved reserve-type cell of the present invention, portions being broken away to illustrate internal features thereof.

DETAILED DESCRIPTION

As shown in the single FIGURE in schematic perspective view, a preferred embodiment of the reserve-type cell of the invention is depicted. Thus, a cell or battery 10 is shown which comprises an outer cylindrical casing 12 having an upper end 14 fitted with a removable upper end cap 16. Cap 12 may be of electrically insulative material such as nylon, tetrafluoroethylene or polyethylene, and preferably snap fits into end 14. An electrical contact 18 of steel or the like is disposed on and through cap 16 and into contact with the first or a pair of internally disposed electrodes described more particularly hereinafter.

Casing 12 also includes an open bottom end 20 slidably received within an electrically conductive cover 22 of copper, steel or the like having a raised rim 24, the inner surfaces of which grip the outer surfaces of casing 12 at end 20. Cover 22 is in electrical contact with the other of the electrode pair internally disposed within casing 12. Casing 12 can be made of any suitable material, for example, electrically insulative self-supporting material such as plastic, wood, heavy cellulosic fibrous material such as paperboard or the like. It will be understood that within the skill of the art selection of other suitable casing materials can easily be made.

Cap 16 provides access to a central cavity 26 within which is disposed to a bibulous or water absorbent material such as fibrous material, particularly fibrous cellulosic material such as cotton wadding, paper wadding or the like. Further suitable examples are the following: asbestos, fiberglass, porous foams such as celulose, polyurethane or polystyrene foams.

Disposed on or in the bibulous material 28 is a dry electrolyte 30 in particulate form as shown in the single FIGURE. Cavity 26 is defined by upper end 14 and cap 16 of casing 12, bottom cover 22 and by a porous cylindrical electrode 32 forming the sidewall thereof. This is all shown in the single FIGURE. Electrode 32 can be porous by virtue of a plurality of small openings 38 punched or otherwise made therein. Alternatively, electrode 32 can be fabricated of metal screening or of honeycombed or otherwise expanded metal material or material rendered porous in any other suitable manner. This electrode does not contain a dry electrolyte incorporated therein by fabrication or otherwise and, accordingly, can be very simply made. It need only transfer or permit the passage therethrough of a liquid electrolyte from cavity 26 into contact with a separator 34 concentrically aligned with electrode 32 and abutting the outer surface thereof.

Separator 34 acts as a means for spacing electrode 32 from a second outer electrode 36 concentrically aligned with electrode 32, the inner surface of electrode 36 abutting the outer surface of separator 34, as shown in the single FIGURE. Separator 34 can be fabricated of any suitable porous stable electrically insulative material. Thus, this material should be capable of withstanding, over a period of time, any corrosive effects which liquid electrolyte in the cell might otherwise exert. In this regard, various types of permeable absorbent materials have been utilized with success, for example, absorbent paper and the like. Alternatively, the separator can be fabricated of, for example, fibrous felts and battings. Electrode 36 forming the other of the pair of electrodes in cell 10 need not be porous but can be if it is desired. However, if electrode 36 is of the air depolarized type, then casing 12 must permit the passage of air thereto. In such event, casing 12 can either be porous or perforated, as by slots (not shown).

The particular electrodes involved can be selected from a wide variety of those which are made in a standard manner and which do not incorporate dry electrolyte therein. As an example, the inside electrode, that is the porous electrode, can be considered the anode and can be fabricated of such materials as zinc, cadmium, magnesium, aluminum, an aluminum alloy or the like. Further examples are as set forth in U.S. Pat. No. 3,189,486 issued June 15, 1965. Electrode 36, depending on the particular metal selected for the anode 32, may be a consumable or non-consumable cathode material. For example, it may be any one of the following: silver oxide, silver chloride, manganese dioxide or the like. Any of the family of air-depolarizable electrodes as are well known in the art can be used. Thus, a typical example of a consumable anode-consumable cathode cell pair, is the following: zinc, silver oxide. A typical example of a consumable anode - non-consumable cathode pair is the following: aluminum-air, as set forth in U.S. Pat. No. 3,647,550 issued Mar. 7, 1972. With each of these pairs, dry electrolyte comprising the following can be used: sodium chloride, potassium chloride, ammonium chloride. Where consumable electrodes are used, as in the preceding example, replacement of one or both electrodes can be made by removal of cap 16 and sliding or otherwise removing one or both electrodes 32 and 36, separator 34, material 28 and electrolyte 30 from casing 12, all of which items can then be replaced as desired. If just the anode is consumable, electrode 36 is left in place. Electrode 36 abuts the inner surface of the sidewall of casing 12 and can be slidable relation thereto for easy removal. Cover 22 forms a sub-unit with casing 12 and electrode 36. It will also be understood that for many purposes it would be undesirable to attempt to replace one or both electrodes of the system and, instead, a new cell is used. Replenishment of dry electrolyte can be made by removing cap 16 which permits access to cavity 26 for addition of the dry electrolyte thereto.

It will be noted that, as shown in the single FIGURE, electrodes 32 and 36 may be relatively thin and closely spaced by separator 34 for maximum efficiency. If the electrolyte were to be stored between the two electrodes or if the two electrodes were to incorporate the electrolyte therein, either the spacing between the two electrodes would be excessive and, accordingly, would change the electrical characteristics of the cell or the electrodes would be bulky and would also exhibit different electrical characteristics than those provided by the present cell 10.

Accordingly, cell 10 represents a departure from the reserve-type cell art. In order to operate cell 10, water is added to cavity 26, as through the open top thereof after removal of cap 16. Cap 16 is replaced and after the water dissolves electrolyte 30, the resulting liquid electrolyte passes through openings 38 in inner electrode 32, pores 40 in separator 34 and into contact with electrode 36 so that both electrodes are in electrical contact with each other through the aqueous electrolyte and the cell is activated. As the liquid electrolyte is consumed in the reaction, capillary action draws fresh liquid electrolyte from bibulous material 28 in cavity through electrode 32 and into communication with separator 34 and electrode 36 to sustain the electrical output of the cell. Cell 10 continues to operate until one or both electrodes are depleted or until the liquid electrolyte is depleted. Additional liquid electrolyte can easily be provided by addition of further amounts of water to cavity 26 for dissolving of excess dry electrolyte 30 carried therein.

Thus, cell 10 has the advantage of being storable in a dry inactivated condition for an indefinite period of time without deterioration. Cell 10 provides means for storing an excess amount of dry electrolyte for activation of cell 10 when desired. Thus, when it is desired to use cell 10 all that need be done is to add water to dry electrolyte 30 therein or to add aqueous electrolyte solution to cavity 26 in the event that dry electrolyte 30 is not already disposed therein. The amount of aqueous electrolyte provided or generated and made available to the electrodes determines whether the cell runs to exhaustion or shuts off beforehand and so is available for reuse. Cell 10 has substantial advantages over conventional cells in compactness, flexibility of use, simplicity of construction, low cost and replaceability of components. Other advantages are as set forth in the foregoing.

Various modifications, changes, alterations and additions can be made in the cell of the present invention. All such changes, alterations, modifications and additions as are within the scope of the amended claims form part of the present invention. What is claimed is the following:

What is claimed is:

1. An improved reserve-type electrochemical cell, said cell comprising, in combination:
   a. a pair of closely spaced electrodes;
   b. a thin inert separator disposed between said electrodes;
   c. electrolyte storage means comprising a storage space containing bibulous material disposed behind and in direct contact with one of said electrodes along the length thereof and out of contact with the other of said electrodes; and
   d. dry electrolyte disposed on said bibulous material, said one electrode in contact with said storage means containing said electrolyte being porous, whereby electrolyte in said storage means when dissolved is freely and directly transferable in liquid form through said one electrode into contact with the other of said electrodes along the length hereof for activation and maintenance of activity of said cell.

2. The improved cell of claim 1 wherein said material comprises fibrous wadding.

3. The improved cell of claim 1 wherein said one electrode is perforated through which said electrode is drawn by capillary action.

4. The improved cell of claim 1 wherein said electrodes and separator are disposed concentrically within an outer protective shell and wherein said shell defines an opening in communication with said electrolyte storage space.

5. The improved cell of claim 1 wherein at least one of said electrodes is consumable.

6. The improved cell of claim 2 wherein said wadding is cellulosic.

7. The improved cell of claim 4 wherein said storage space is a central cavity in said shell concentric with said one electrode.

8. The improved cell of claim 5 wherein said dry electrolyte is consumable and is in said cell in a concentration in excess of that required for use of in said cell until said electrode is consumed.

9. The improved cell of claim 7 wheein said dry electrolyte is a salt and wherein said opening of said shell is removably plugged with a closure.

* * * * *